United States Patent
Smith

[15] 3,647,164
[45] Mar. 7, 1972

[54] LAUNCH BAR INSTALLATION
[72] Inventor: Harold R. Smith, Encino, Calif.
[73] Assignee: The United States of America as represented by the Secretary of the Navy
[22] Filed: Aug. 19, 1970
[21] Appl. No.: 65,162

[52] U.S. Cl. ..........................................................244/63
[51] Int. Cl. ......................................................B64f 1/04
[58] Field of Search.....................244/63, 50, 103, 111, 115, 244/116

[56] References Cited

UNITED STATES PATENTS

| | | | |
|---|---|---|---|
| 2,942,805 | 6/1960 | Simnoch | 244/63 |
| 3,155,345 | 11/1964 | Paysen et al. | 244/63 |
| 3,178,132 | 4/1965 | Wood et al. | 244/63 |
| 3,370,811 | 2/1968 | Boody | 244/63 |

*Primary Examiner*—Milton Buchler
*Assistant Examiner*—Paul E. Sauberer
*Attorney*—Richard S. Sciascia, Q. Baxter Warner and Gayward N. Mann

[57] ABSTRACT

An aircraft nosewheel landing gear structure incorporating an oleo strut supported launch bar mechanism capable of movement when airborne to a wheel-contacting (braking) position prior to retraction of the nosewheel into the aircraft wheel well.

5 Claims, 9 Drawing Figures

HAROLD R. SMITH
INVENTOR

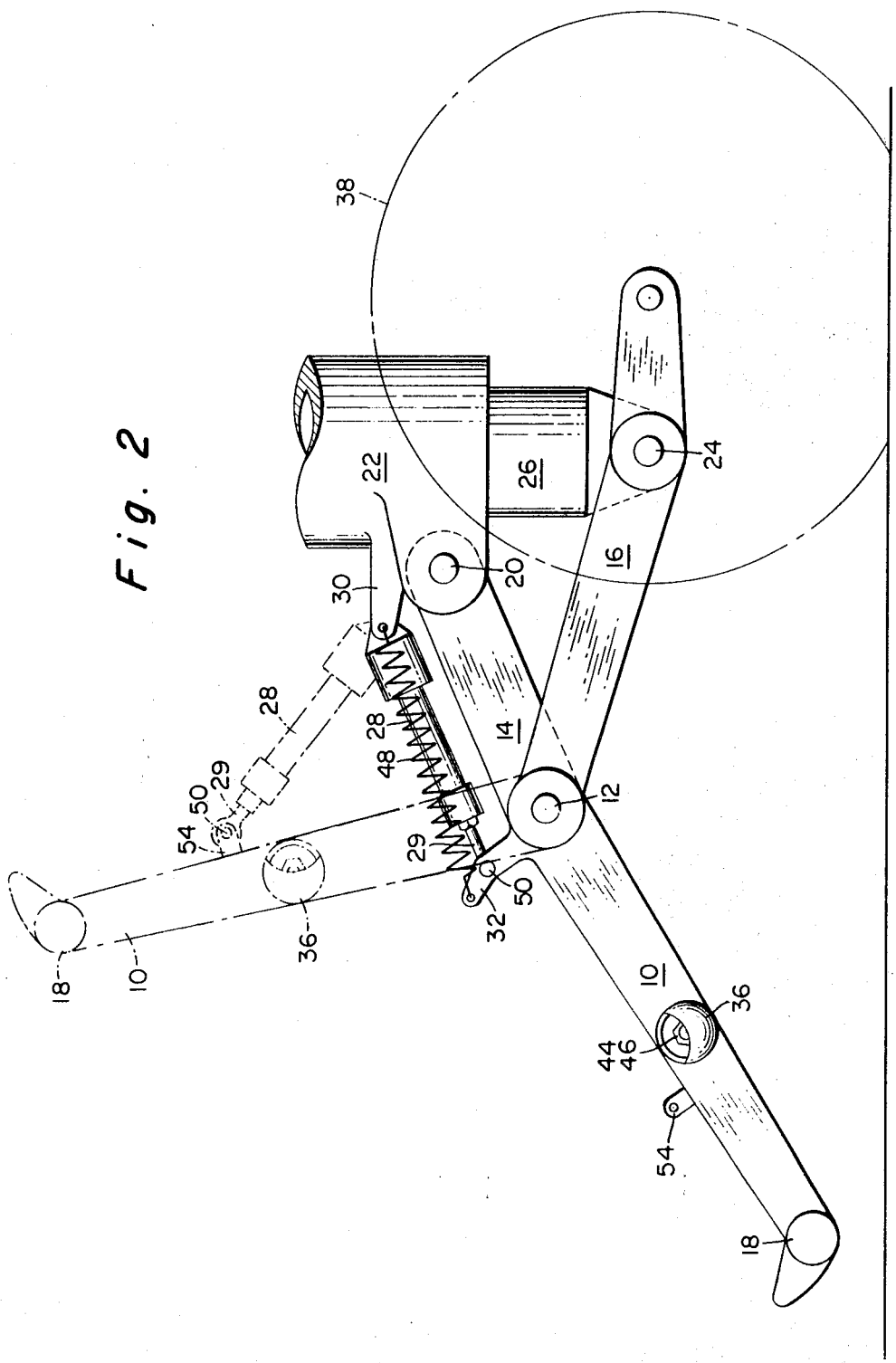

LAUNCH BAR INSTALLATION

STATEMENT OF GOVERNMENT INTEREST

The invention described herein may be manufactured and used by or for The Government of the United States of America for governmental purposes without the payment of any royalties thereon or therefor.

BACKGROUND OF THE INVENTION

1. Field of the Invention

This invention relates to aircraft nosewheel landing gear structures and more particularly to a launch bar mechanism capable of braking the nosewheel prior to its retraction within the aircraft wheel well.

2. Description of the Prior Art

Various devices have been employed for stopping rotation of aircraft wheels prior to their retraction within the aircraft wheel well. One such device is shown in U.S. Pat. No. 2,502,110 entitled "Brake for Aircraft Wheels Having Retractable Supports," which issued Mar. 28, 1950, to H. Trevaskis. That device employs a hydraulically operated brake attached to the wheel support which brake is hydraulically applied during retraction of the wheels into the aircraft.

SUMMARY OF THE INVENTION

The present invention comprises an aircraft nosewheel structure with a forwardly extending launch bar pivotally mounted on the conventional oleo strut torque links. A hydraulic cylinder is adapted to maintain the bar in a position for engagement by the shuttle of a ship deck catapult system and then, after launch, moves the bar to a wheel tread contacting (brake) position. Thereafter the entire structure is moved to a stowed position within the nosewheel well. The wheel braking action is accomplished by bringing transversely disposed brake shoe elements on the bar into contact with the treads of the nosewheel tires.

STATEMENT OF THE OBJECTS OF THE INVENTION

An object of the present invention is to provide an auxiliary landing gear structure adapted for positive engagement with the shuttle of a catapult.

Another object is to provide an auxiliary landing gear structure which is adapted to stop rotation of an aircraft nosewheel prior to retraction within the aircraft.

Still another object is to provide an auxiliary landing gear structure of the character described which is simple in construction and reliable in operation.

Other objects, advantages and novel features of the invention will become apparent from the following detailed description of the invention when considered in conjunction with the accompanying drawings wherein:

BRIEF DESCRIPTION OF THE DRAWINGS

FIG. 2 is an enlarged, side elevational outline view of the structure of FIG. 1 in the launch position, with the stowed position of the launch bar shown in phantom.

DESCRIPTION OF THE PREFERRED EMBODIMENT

The present invention involves modification of a conventional aircraft nosewheel landing gear structure by the addition of a launch bar and bar positioning mechanism thereto. Said bar also includes wheel contacting brake members which serve to stop nosewheel rotation when the launch bar is in one of its adjusted positions. The mechanism functions primarily to hook up the aircraft with a carrier catapult shuttle and, after launch, to arrest rotation of the nosewheels prior to their retraction within the aircraft wheel well. Such wheel arrestment is a desirable provision because continued wheel rotation may result in accumulation of excessive debris within the wheel well and accumulation of an undesirable electrostatic charge with accompanying risk of fire.

Figure 1:
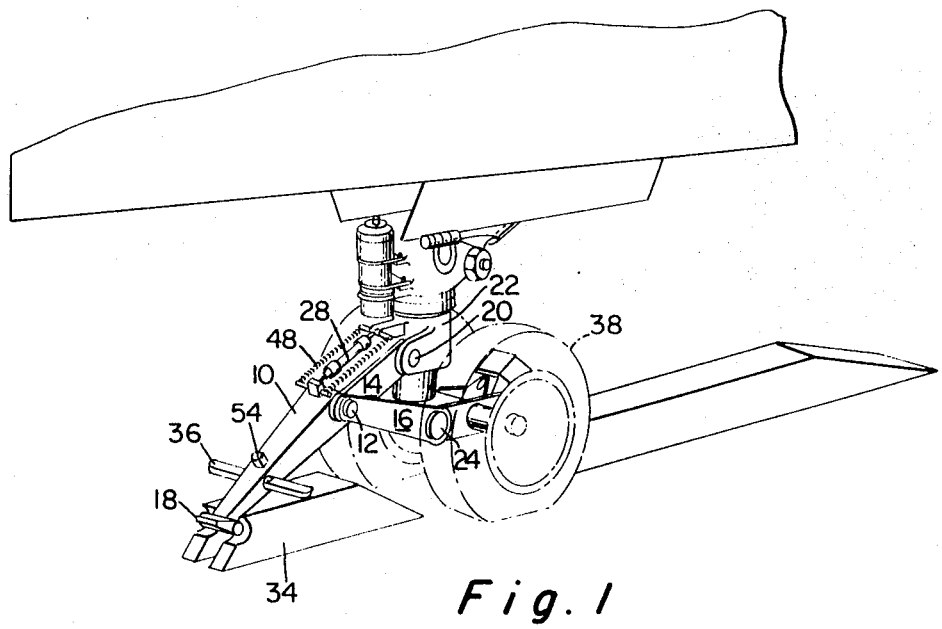
FIG. 1 is a perspective view of an aircraft nosewheel landing gear structure incorporating the present invention in the catapult launch position.

The mechanism includes a forwardly extending launch bar 10 pivotally mounted at point 12 on the two conventional oleo strut torque links 14 and 16. The launch bar 10 may have a generally H-shaped cross-sectional appearance (FIG. 5) with laterally projecting catapult shuttle engaging protrusions 18 located at the forward end. The upper torque link 14 is pivotally connected at 20 to the oleo housing strut 22 and the second torque link 16 is pivotally connected at 24 to the lower end of vertically moveable oleo strut 26. A pilot controlled hydraulically operated launch bar actuating cylinder 28, is attached at one end to oleo housing clevis boss 30 and has a piston rod 29 secured at its end to launch bar clevis boss 32. Movement of the piston rod controls movement of launch bar 10 about pivot point 12 to various positions, one being the shuttle hookup position (FIGS. 1 and 2) wherein it is shown in position for engagement with a conventional catapult shuttle 34.

Figure 3:
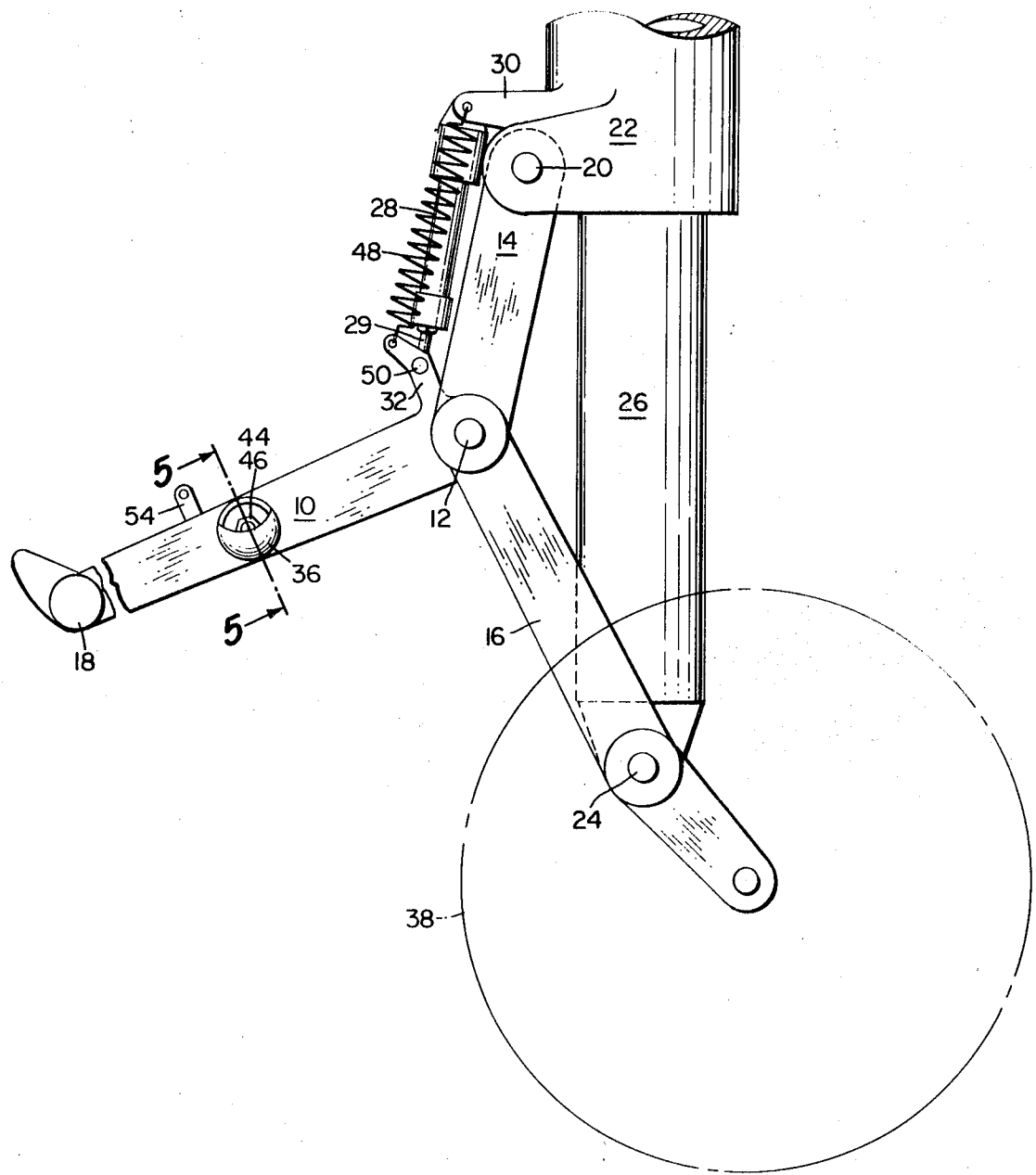
FIG. 3 is a similar view showing the parts in the airborne (and landing) position.

After aircraft launch and consequent launch bar release from the catapult shuttle, the oleo strut 26 extends downwardly out of oleo housing 22 extending both torque links 14 and 16 downwardly to the position shown in FIG. 3. With the oleo strut extended the launch bar 10 may then be rotated about point 12 by extension of cylinder 28 to the wheel-contacting (brake) position shown in FIG. 4. As shown the brake shoes 36 are thus brought into firm contact with the tread of the nosewheel tires 38 to effectively stop all wheel rotation. Thereafter the entire nosewheel landing gear structure may be retracted within the nosewheel well of the aircraft.

Figure 5:
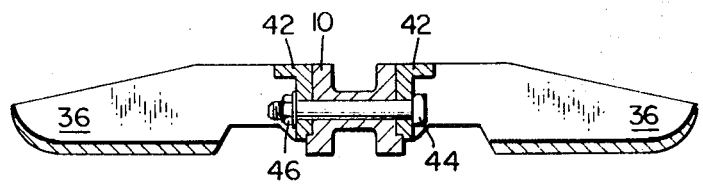
FIG. 5 is a cross-sectional view, slightly enlarged, through a launch bar, taken on a line substantially corresponding to line 5—5 of FIG. 3.

Referring to FIG. 5, it will be noted that the brake shoes 36 may be mounted on opposite sides of launch bar 10 by flanges 42 and bolt and nut 44 and 46. As shown shoes 36 are shaped for contact with the tread portions of the nosewheel tires 38 and effectively arrest the wheel rotation prior to retraction of the nosewheel assembly within the wheel well.

A pair of launch bar elevating springs 48 one on each side of hydraulic cylinder 28 interconnects housing clevis boss 30 with launch bar clevis boss 32. These ensure fail-safe release of the brake shoes 36 from the wheel treads in the event of loss of pressure in cylinder 28.

In order to permit towing of an aircraft equipped with the present invention, clevis pin 50 may be removed from clevis boss 32, freeing the end of piston rod 29 and permitting the launch bar 10 to be manually raised upwardly to the position shown in phantom in FIG. 2. The end of piston rod 29 is then connected to clevis boss 54 by insertion of pin 50. Thus launch bar 10 is held in an out of the way, up position during towing movement of the aircraft about a carrier deck. When the aircraft is to be hooked up with a catapult shuttle the pin 50 is removed from clevis boss 54 and the launch bar 10 pivoted downwardly to the position shown in FIG. 2. The end of piston rod 29 is then positioned in clevis boss 32 and pin 50 reinserted.

Figure 6:
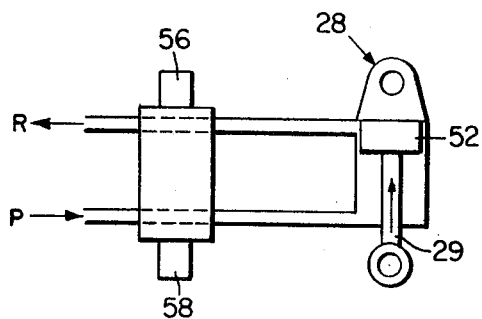
FIG. 6 is a schematic representation of the hydraulic circuitry employed in controlling the operation of the launch bar actuating cylinder, showing the circuitry for moving the launch bar to the up position.
Figure 7:
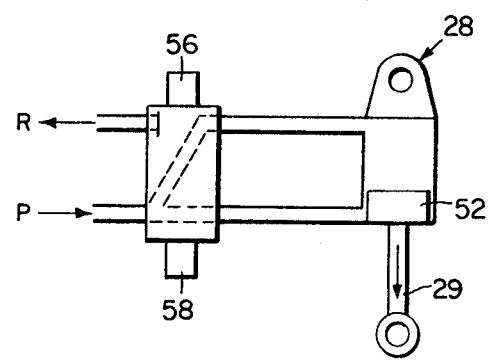
FIG. 7 is a similar view showing the circuitry for placing the launch bar in the extended position for prelaunch tracking positioning of the oleo strut parts.

FIGS. 6, 7, 8 and 9 show the hydraulic circuitry for controlling the operation of the launch bar actuating cylinder 28. In FIG. 6 solenoid actuated flow control valves 56 and 58 are shown in the straight-through open position so that incoming pressure from line "P" acts on the undersurface of piston 52 to retract piston rod 29 and swing launch bar 10 upwardly. FIG. 7 shows valves 56 and 58 energized to provide crossover pressure flow to both the upper and lower sides of piston 52. Because of the difference in area exposed to such pressure, piston rod 29 attempts to extend. This moves launch bar 10 to the prelaunch shuttle hookup position of FIG. 2.

Figure 8:
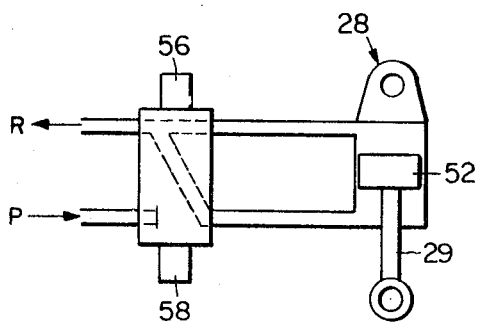
FIG. 8 is a similar view showing the circuitry for placing the launch bar in the unpressurized position which exists when the nosewheel assembly is retracted within the wheel well.

FIG. 8 shows solenoids 56 and 58 energized to another crossover position where both sides of the piston 52 are ported to the pressure release line "R." This occurs when the nosewheel gear has been retracted and both sides of piston 52 are completely depressurized.

Figure 4:
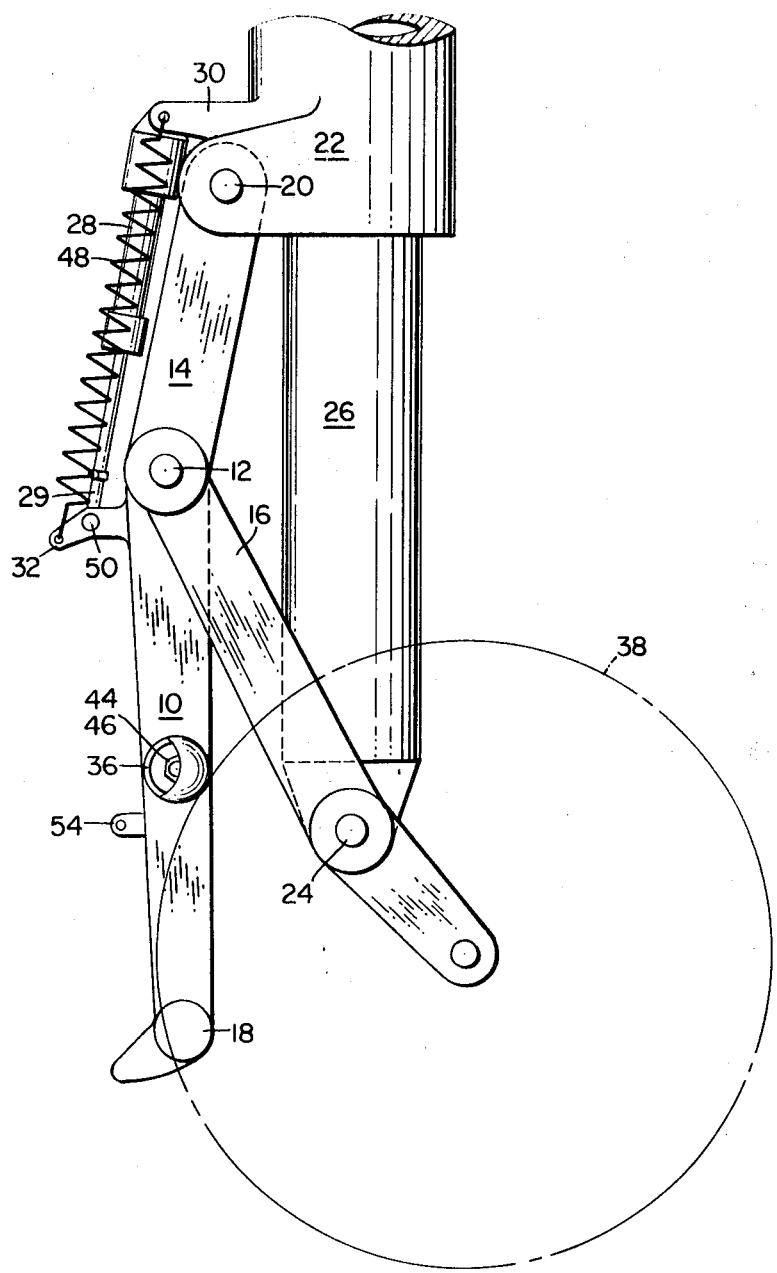
FIG. 4 is a similar view showing the launch bar in the "wheel braking" position.
Figure 9:
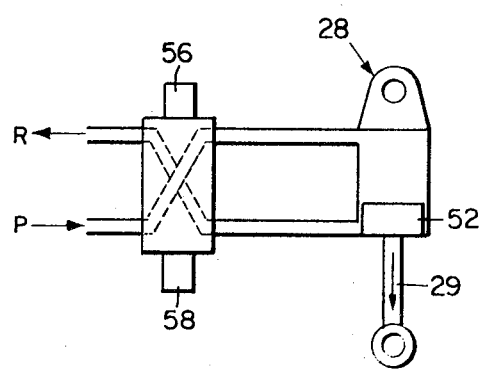
FIG. 9 is a similar view showing the circuitry for placing the launch bar in the extended position for stopping wheel rotation.

FIG. 9 shows a double crossover arrangement whereby hydraulic pressure "P" is applied to the upper surface of the piston 52 and the space below the piston is ported to pressure release "R." This is the position employed when the brake shoe arms 36 are caused to bear against the tread of wheels 38 for maximum braking effort to prevent wheel rotation. The resulting braking effect is shown in FIG. 4.

In all of these views the resultant movement of piston rod 29 is depicted by an arrow.

The above described hydraulic circuitry includes conventional solenoid operated valve members capable of porting pressure and release passages along the paths diagrammatically depicted, all as is well known in the art.

Obviously many modifications and variations of the present invention are possible in the light of the above teachings. It is therefore to be understood that within the scope of the appended claims the invention may be practiced otherwise than as specifically described.

I claim:

1. In an aircraft nosewheel oleo strut arrangement wherein telescoping upper and lower members are interconnected by articulated links, the combination of:
    a forwardly directed launch bar, said bar being hingedly joined at the point of articulation of said links, and
    an actuating cylinder linking said launch bar and the upper member of the telescoping oleo strut arrangement, said cylinder adapted to orient the launch bar for engagement by a launch member.

2. The aircraft nosewheel oleo strut arrangement as defined in claim 1 wherein:
    wheel tread engaging brake shoe members are mounted upon said launch bar, said actuating cylinder being adapted to orient the launch bar with the brake shoe members in a contact position against the nosewheel to arrest rotation thereof.

3. The aircraft nosewheel oleo strut arrangement as defined in claim 1 wherein:
    a launch bar spring positioned under tension contiguous to the launch bar is adapted to provide for suitable sequential movement of said launch bar in the event of failure of the actuating cylinder.

4. The aircraft nosewheel oleo strut arrangement as defined in claim 1 wherein:
    the actuating cylinder may be disconnected from the launch bar and suitably reconnected thereto after said launch bar has been manually moved to a substantially upright position which is required when the aircraft is to be towed.

5. The aircraft nosewheel oleo strut arrangement as defined in claim 2 wherein:
    said brake shoe members comprise a pair of arcuate-shaped members being adapted to contact the treaded surfaces of dual nosewheels and arrest rotation thereof.

* * * * *